(12) United States Patent
Okada

(10) Patent No.: US 8,731,024 B2
(45) Date of Patent: May 20, 2014

(54) NOISE SUPPRESSION APPARATUS

(75) Inventor: Hiroyuki Okada, Tokyo (JP)

(73) Assignee: NEC Corporation, Tokyo (JP)

( * ) Notice: Subject to any disclaimer, the term of this patent is extended or adjusted under 35 U.S.C. 154(b) by 140 days.

(21) Appl. No.: 12/863,936

(22) PCT Filed: Jan. 7, 2009

(86) PCT No.: PCT/JP2009/050082
§ 371 (c)(1),
(2), (4) Date: Jul. 21, 2010

(87) PCT Pub. No.: WO2009/093482
PCT Pub. Date: Jul. 30, 2009

(65) Prior Publication Data
US 2010/0296549 A1    Nov. 25, 2010

(30) Foreign Application Priority Data

Jan. 25, 2008 (JP) ................................. 2008-014765

(51) Int. Cl.
*H04B 1/713* (2011.01)
(52) U.S. Cl.
USPC ............................ 375/132; 375/130; 375/136
(58) Field of Classification Search
CPC ...................................................... H04B 1/715
USPC ....................................................... 375/136
See application file for complete search history.

(56) References Cited

U.S. PATENT DOCUMENTS

| | | | | |
|---|---|---|---|---|
| 4,302,768 A | * | 11/1981 | Kamura et al. | 386/273 |
| 5,748,681 A | * | 5/1998 | Comino et al. | 375/319 |
| 2005/0009485 A1 | * | 1/2005 | Tanaka | 455/193.1 |
| 2006/0240779 A1 | * | 10/2006 | Rostami et al. | 455/63.1 |
| 2007/0058753 A1 | * | 3/2007 | Saavedra et al. | 375/329 |
| 2008/0024337 A1 | * | 1/2008 | Marsili et al. | 341/120 |

FOREIGN PATENT DOCUMENTS

| | | |
|---|---|---|
| JP | 2000357955 A | 12/2000 |
| JP | 2001211098 A | 8/2001 |
| JP | 2002232502 A | 8/2002 |
| JP | 2004343164 A | 12/2004 |
| JP | 2005073199 A | 3/2005 |
| JP | 2006020334 A | 1/2006 |
| JP | 2006203686 A | 8/2006 |
| JP | 2006238243 A | 9/2006 |
| JP | 2008258741 A | 10/2008 |
| WO | 2006118184 A | 11/2006 |

OTHER PUBLICATIONS

International Search Report for PCT/JP2009/050082 mailed Feb. 10, 2009.
Standard ECMA-368. "High Rate Ultra Wideband PHY and MAC Standard", 1st Edition, Dec. 2005, pp. 7, 14-16.

* cited by examiner

*Primary Examiner* — Michael Neff
(74) *Attorney, Agent, or Firm* — Sughrue Mion, PLLC

(57) ABSTRACT

A noise suppression apparatus is provided with: an offset correction unit that corrects changes in a DC offset generated by the hopping of radio frequencies or a local leak correction unit that corrects changes of local leaks generated by hopping of radio frequencies; and a noise elimination unit that suppresses the amplitude of noise generated by the offset correction unit or local leak correction unit and that is provided with switches that turn ON and OFF in synchronization with the hopping of radio frequencies, and an amplitude suppression unit connected between two differential output lines of the offset correction unit or the local leak correction unit by way of the switches.

18 Claims, 12 Drawing Sheets

CORRECTION SIGNAL

NOISE SUPPRESSION APPARATUS

TECHNICAL FIELD

The present invention relates to a noise suppression apparatus for suppressing the amplitude of noise that occurs when correcting the DC component (DC offset) that occurs in a reception apparatus provided in a radio apparatus or of noise that occurs when correcting a local leak component that occurs in a transmission apparatus.

BACKGROUND ART

In recent years, radio apparatuses are being used for data communication between apparatuses in portable electronic apparatuses, household electronic appliances, or peripheral apparatuses for personal computers. Increases in the amount of data in radio apparatuses has been accompanied by demand for increases in the transmission speed as well as energy efficiency, and UWB (Ultra-Wide Band) communication apparatuses that employ, for example, multiband OFDM (Orthogonal Frequency Division Multiplexing) are anticipated as a communication method that can meet these demands (for example, see "High Rate Ultra Wideband PHY and MAC Standard," ECMA International Standard ECMA-368 1$^{st}$ Edition, December 2005, pp. 7, 14-16). There is also a demand in recent years for reducing costs in radio apparatuses by unifying communication standards to enable use in a wider range of equipment.

One known configuration that is advantageous for achieving lower costs of a radio apparatus is the direct conversion method such as shown in FIG. 1 that effects direct conversion of a radio frequency (RF) signal to baseband signal by means of a local oscillation frequency (LO) signal. FIG. 1 shows an example of a configuration of a reception apparatus of the background art that adopts the direct conversion method.

The reception apparatus shown in FIG. 1 is provided with antenna apparatus 101, low noise amplification circuit (LNA) 102, mixer 103, local oscillator (LO) 104, first variable gain amplifier (VGA) 105, low pass filter (LPF) 106, second VGA 107, and A/D converter (ADC) 108.

LNA 102 amplifies an RF signal that is received by antenna apparatus 101.

Mixer 103 mixes the RF signal supplied from LNA 102 with an LO (local oscillation frequency) signal supplied from LO 104 to produce a baseband signal.

First VGA 105 and second VGA 107 amplify the baseband signal that is supplied from mixer 103 to match the dynamic range of ADC 108.

LPF 106 eliminates the unnecessary high frequency component that is contained in the baseband signal.

ADC 108 converts the baseband signal that is composed of an analog signal to a digital signal and supplies the result to a baseband processing circuit (not shown).

The direct conversion method is capable of conversion from an RF signal to a baseband signal and from a baseband signal to an RF signal with few parts and therefore enables a radio apparatus at low cost. However, the direct conversion method is known to have the problems described below.

In the reception apparatus shown in FIG. 1, an RF signal supplied from LNA 102 and an LO signal supplied from LO 104 are mixed by mixer 103 as described above to produce a baseband signal. At this time, mixer 103 both mixes the RF signal and LO signal as well as the leakage component (hereinbelow referred to as the "LO component") 109 of the LO signal that is leaked from LO 104 to mixer 103 by way of the substrate or power supply and the LO signal supplied from LO 104, whereby a DC component (DC offset) is generated in the baseband signal. The amount of leakage of LO component 109 to this mixer 103 is changed by the frequency of the LO signal, and the value of the DC offset that is supplied from mixer 103 therefore changes according to the frequency of the LO signal.

As described hereinabove, first VGA 105 and second VGA 107 adjust gain such that the input signal of ADC 108 is not saturated. As a result, when DC offset is contained in the output of mixer 103, first VGA 105 and second VGA 107 amplify the baseband signal by suppressing the gain such that the input signal of ADC 108 is not saturated by the DC offset. As a result, the baseband signal is not adequately amplified and the reception sensitivity drops. This phenomenon is referred to as self-mixing because LO component 109 that has leaked to the RF signal is mixed by the LO signal itself.

Regarding the causes for the appearance of DC offset in the output of mixer 103, it is known that a DC offset is also caused by, in addition to the above-described self-mixing, discrepancies in the characteristics of each part of mixer 103, but explanation here regards only DC offset produced by self-mixing.

The DC offset that appears in the offset of mixer 103 becomes an even more serious problem when an LO signal of a plurality of different frequencies is used. For example, in a UWB communication apparatus (hereinbelow referred to as simply "UWB") that employs the above-described OFDM method, a communication band of from 3.1 GHz to 10.6 GHz is divided into 14 bands and a signal subjected to OFDM modulation is transmitted and received using a band of 528 MHz per band. In a UWB, moreover, three bands are assigned to each terminal and data are transmitted and received by switching these bands each 312.5 ns (see FIG. 2). A method of switching radio frequencies that are used as carriers with the passage of time is therefore referred to as frequency hopping.

When hopping radio frequencies in the reception apparatus of the direct conversion method shown in FIG. 1, the size of the DC offset that appears in the output of mixer 103 changes as shown in FIG. 3. At this time, when the hopping frequency component that corresponds to the hopping period approaches the band of the received signal, eliminating only the hopping frequency component becomes problematic, resulting in the blockage of a portion of the band of the received signal, deterioration of S/N, and a further reduction of reception sensitivity.

The configuration shown in FIG. 4A and FIG. 4B is known as a first example of the background art for ameliorating this problem. FIG. 4A and FIG. 4B show an example of a baseband circuit provided in a radio apparatus described in Japanese Laid-Open Patent Publication No. 2001-211098.

FIG. 4A and FIG. 4B show a configuration that detects the DC offset supplied from a VGA and controls the output voltage of the VGA such that the detected DC offset becomes 0.

The circuit shown in FIG. 4A uses an A/D converter (ADC) to convert the DC offset that appears in the output of VGA 401 to a digital signal, generates a correction signal for correcting the DC offset by means of a control circuit, uses a D/A converter (DAC) to convert the generated correction signal to an analog signal, and supplies the analog signal to the control terminal of VGA 401.

Similarly, an A/D converter (ADC) is used to convert the DC offset that appears in the output of VGA 402 to a digital signal, a correction signal for correcting the DC offset is generated by a control circuit, a D/A converter (DAC) is used to convert the generated correction signal to an analog signal, and the analog signal is supplied to a control terminal of VGA 402.

The circuit shown in FIG. 4A is further provided with switch 405 that short-circuits two signal lines for applying differential input to VGA 402. By turning ON switch 405 at the time of correcting the DC offset of VGA 402, the input signal of VGA 402 is set to zero.

The circuit shown in FIG. 4B uses an A/D converter (ADC) to convert the DC offset that appears in the output of succeeding VGA 404 to a digital signal, generates a correction signal for correcting the DC offset by means of a control circuit, and uses a D/A converter (DAC) to convert the generated correction signal to an analog signal and supplies the analog signal to the control terminal of preceding VGA 403.

The circuit shown in FIG. 4B is further provided with switches 407 in LPF 406 that is inserted between VGA 403 and VGA 404. Switches 407 are components for ameliorating the problem of the time required for correcting of the DC offset due to the delay of LPF 406, switches 407 being turned OFF at the time of correction to decrease the time constant of LPF 406 and thus shorten the convergence time required for correction.

The first example of the background art enables both the correction of the offset of a VGA and the DC offset resulting from self-mixing supplied from a mixer. The first example of the background art further enables correction of DC offset even when DC offset of different values is supplied from the mixer in synchronization with frequency hopping by executing a process similar to that described hereinabove for each hopping frequency.

The configuration described in Japanese Laid-Open Patent Publication No. 2006-203686 is a second example of the background art for correcting DC offset that appears in the output of a mixer.

As shown in FIG. 5, the second example of the background art is of a configuration provided with three sets of switch 501 and capacitor 502 connected in series and in which three high-pass filters (HPF) made up of these three sets and resistor 503 are connected to the outputs of a mixer. In the example shown in FIG. 5, three HPF are provided on each I-channel and on each Q-channel.

Switches 501 repeatedly turn ON and OFF in synchronization with frequency hopping. The operation is described by taking as an example a case in which an LO signal hops among the three frequencies F1, F2, and F3.

In the configuration shown in FIG. 5, SW#1 turns ON and SW#2 and SW#3 turn OFF when the local frequency is F1. At this time, the output signal of the mixer is supplied to the LPF by way of the HPF made up by C#1 and R, and the direct-current component of the signal that is integrated by C#1 and R is accumulated at the two ends of C#1.

When the local frequency next hops from F1 to F2, SW#1 and SW#3 turn OFF and SW#2 turns ON. At this time, the output signal of the mixer is supplied to the LPF by way of the HPF made up by C#2 and R, and a direct-current component of the signal integrated by C#2 and R is accumulated at the two ends of C#2.

When the local frequency hops from F2 to F3 as well, the direct-current component of the signal that is integrated by C#3 and R is similarly accumulated at the two ends of C#3. By repeating the above-described process, the direct-current components corresponding to each local frequency are accumulated at capacitors C#1-3 and the DC offset supplied as output from the mixer by frequency hopping is not supplied to the LPF.

The configuration described in Japanese Laid-Open Patent Publication No. 2006-020334 shown in FIG. 6 is the third example of the background art for correcting the DC offset that appears in the offset of a mixer.

The third example of the background art is a configuration in which, similar to the first example of the background art shown in FIG. 4A and FIG. 4B, the DC offset that appears in the output of an amplification unit (a VGA in the first example of the background art) is converted to a digital signal by an A/D converter (ADC) and supplied to a control unit, and the correction signal generated in the control unit is converted to an analog signal by a D/A converter (DAC) and fed back to the input of the amplification unit.

The two chief points of difference between the third example of the background art and the first example of the background art are as follows:

First, in the first example of the background art, the DC offset of a VGA is corrected by supplying a correction signal to the VGA. In contrast, the third example of the background art is a configuration in which the DC offset of an amplification unit is corrected by applying a correction signal to adder 601 that is arranged to precede the amplification unit (VGA).

Second, in the first example of the background art, the DC offset supplied from a mixer for each instance of frequency hopping is converted to an analog signal using one DAC and supplied to the VGA. In contrast, in the third example of the background art, a DAC is provided corresponding to each hopping frequency, the correction value of the DC offset that is generated at each frequency is saved in advance in a register, and the value saved in each register is converted to an analog signal by a corresponding DAC and supplied to adder 601. In a configuration that uses a plurality of DAC in this way, DAC having a comparatively slow conversion speed can be applied in a radio apparatus that requires high-speed frequency hopping.

The above-described frequency hopping is known to have an adverse effect not only upon a reception apparatus but also upon a transmission apparatus.

When the offset of a mixer and/or the DC offset of a baseband signal that is applied as input to the mixer are mixed by an LO signal in a transmission apparatus, the frequency component of the LO signal appears in the output of the mixer (this phenomenon is hereinbelow referred to as a local leak). Unwanted radiation produced by the transmission of this LO signal may result in failure to meet the standards of the radio apparatus that have been established by law.

In addition, the amount of a local leak changes according to the frequency of the LO signal that results from discrepancies in the characteristics of the parts that make up a mixer, whereby a local leak must be corrected for each frequency of the LO signal in a system that adopts frequency hopping.

The configuration described in Japanese Laid-Open Patent Publication No. 2006-238243 and shown in FIG. 7 is known as the fourth example of the background art for correcting DC offset produced in a transmission apparatus. In FIG. 7, the configuration described in Japanese Laid-Open Patent Publication No. 2006-238243 is shown simplified to an extent sufficient for grasping the essential points.

The fourth example of the background art is of a configuration in which the output of mixer (modulation circuit) 702 is monitored in comparator 703 and a correction signal generated in control logic circuit 704 is applied as input to an adder provided on the input side of the mixer such that the LO signal supplied from mixer 702 is eliminated. By means of this configuration, local leaks can be reduced even when the mixer is made up by using parts having large discrepancies in characteristics.

However, a configuration that employs the above-described first to fourth examples of the background art for correcting local leaks or DC offsets suffers from the problems described below.

The first problem is the occurrence of spike noise caused by the correction error produced when the changes in DC offset that result from frequency hopping cannot be accurately corrected. This phenomenon is explained below using FIG. 8.

FIG. 8 shows an example of a signal waveform of a reception apparatus that carries out frequency hopping by the three frequencies F1, F2, and F3.

In the output of the mixer, a waveform appears that contains an LO signal that corresponds to F1, F2, and F3, DC offset shown by a broken line, and the received signal (not shown). In FIG. 8, only changes of the DC offset are extracted and shown.

The DC offset can be corrected by generating an ideal correction value (see "ideal correction value" in FIG. 8) having an absolute value equal to the DC offset but with an inverted polarity and then by adding this ideal correction value to the output signal of the mixer. Here, generation of the ideal correction value requires both the high-speed detection of changes in the DC offset and the use of a DAC that features both high speed and high-resolution. These requirements increase the cost of the radio apparatus. When a simple DAC is used to limit an increase in cost, a correction value that can keep up with change of the DC offset cannot be generated (see "actual correction value" of FIG. 8), and a correction error is produced in time intervals (frequency transition intervals) in which the radio frequency transitions due to frequency hopping.

As previously described, the occurrence of a DC offset in the output of a mixer suppresses gain of the VGA and thus reduces the reception sensitivity, and the DC offset is therefore preferably eliminated before the baseband signal that is supplied as output from the mixer is applied to the VGA.

However, when a circuit for correcting the DC offset that uses a DAC is provided on the output side of a mixer, a correction error that is generated in the above-described frequency transition intervals is supplied to the VGA, whereby this correction error is amplified to produce the spike noise as shown in the "correction output" of FIG. 8.

The second problem is the generation of large spike noise by divergence of the correction timing during correction of the DC offset. FIG. 8 shows an example of the correction error that occurs in frequency transition intervals in frequency hopping, but a correction error also occurs when the timing of correction diverges from the timing of frequency hopping. The spike noise that occurs as a result of this divergence of the correction timing also occurs in a configuration that does not employ a DAC as in the second example of the background art. In other words, when the timing of frequency hopping diverges from the timing of switching switches 501 shown in FIG. 5, a correction error is produced and spike noise is generated.

The correction error that is caused by this divergence of correction timing is particularly conspicuous in a radio apparatus in which high-speed frequency hopping is required. For example, the completion of frequency hopping in a 9.47 ns period for each 312.5 ns is demanded in a UWB communication apparatus. This type of high-speed frequency hopping was not demanded of radio apparatuses of the prior art, but as the demand for higher speeds for data transfer rates continues to increase into the future, the potential exists that even faster frequency hopping will be required.

In radio apparatuses in recent years, the trend is toward longer wiring length due to, for example, the increasing scale of LSI that accompanies the increase in functions, and as a result, skew adjustment has become necessary for the timing of switching frequencies and the timing of the output of a DC offset correction value. These requirements increase the design man-hours of the radio apparatus and therefore increase costs.

The third problem is the generation of spike noise due to the glitch noise of the DAC in a configuration that uses a DAC to correct DC offset.

When supplying an analog value that corresponds to the digital code that is received as input, a DAC may at times instantaneously supply an analog value (glitch noise) that differs from the digital code preceding alteration or the digital code after alteration.

The glitch noise supplied from a DAC becomes a correction error of the DC offset and therefore, as in the first and second problems described above, is amplified by a succeeding VGA to result in spike noise.

Although the amelioration of this phenomenon necessitates the use of a DAC in which glitch noise does not occur, the use of a high-performance DAC in which glitch noise does not occur tends to increase the scale and power consumption of the offset correction circuit for correcting DC offset. Although a method can be considered in which the output signal of the DAC is subjected to filtering to reduce the glitch noise, in this case the design is complicated by the need to prevent deterioration of the settling characteristics of the DAC.

The fourth problem is the occurrence of spike noise resulting from the occurrence of correction error, divergence of the correction timing, or glitches of the DAC, as in the first to third problems described hereinabove, even in configurations that correct local leaks shown in the fourth example of the background art.

When spike noise is supplied as output from a mixer provided in a transmission apparatus, the operation of an amplification circuit for transmission of a succeeding stage becomes saturated, raising the danger of the generation of unwanted radiation and the failure to meet standards established by laws. Implementing skew adjustment or improving DAC characteristics to reduce this spike noise tends to increase the circuit scale or power consumption of the radio apparatus.

DISCLOSURE OF THE INVENTION

Summary

It is therefore an object of the present invention to provide a noise suppression apparatus that can suppress the amplitude of noise that is generated by correcting a DC offset or local leaks that occur in radio frequency hopping.

The exemplary aspect of the noise suppression apparatus of the present invention for achieving the object described above suppresses the amplitude of noise generated in a reception apparatus and includes:

at least one offset correction unit that corrects changes in a DC offset generated by hopping of radio frequencies; and at least one noise elimination unit that suppresses the amplitude of noise in the offset correction unit and that is provided with switches that turn ON and OFF in synchronization with the hopping of radio frequencies, and an amplitude suppression unit that is connected between two differential output lines of the offset correction unit by way of the switches.

Alternatively, the exemplary aspect of the noise suppression apparatus of the present invention suppresses the amplitude of noise generated in a reception apparatus and includes:

at least one offset correction unit that corrects changes in a DC offset generated by hopping of radio frequencies; and at least one noise elimination unit that suppresses the amplitude of the noise generated in the offset correction unit and that is provided with switches that turn ON and OFF in synchronization with the hopping of radio frequencies, and two amplitude suppression units respectively connected between low-impedance nodes and two differential output lines of the offset correction unit by way of the switches.

Alternatively, the exemplary aspect of the noise suppression apparatus of the present invention suppresses the amplitude of noise generated in a reception apparatus and includes:

at least one offset correction unit that corrects changes in a DC offset generated by hopping of radio frequencies; and at least one noise elimination unit that suppresses the amplitude of the noise generated in the offset correction unit and that is provided with a switch that turns ON and OFF in synchronization with the hopping of radio frequencies and that is connected between two differential output lines of the offset correction unit.

Alternatively, the exemplary aspect of the noise suppression apparatus of the present invention suppresses the amplitude of noise generated in a transmission apparatus and includes:

at least one local leak correction unit that corrects changes of local leaks generated by hopping of radio frequencies; and at least one noise elimination unit that suppresses the amplitude of the noise generated in the local leak correction unit and that is provided with switches that turn ON and OFF in synchronization with the hopping of radio frequencies, and an amplitude suppression unit connected between two differential output lines of the local leak correction unit by way of the switches.

Alternatively, the noise suppression apparatus of the present invention suppresses the amplitude of noise generated in a transmission apparatus and includes:

at least one local leak correction unit that corrects change of local leaks generated by hopping of radio frequencies; and at least one noise elimination unit that suppresses the amplitude of the noise generated in the local leak correction unit and that is provided with switches that turn ON and OFF in synchronization with the hopping of radio frequencies, and two amplitude suppression units respectively connected between low-impedance nodes and two differential output lines of the offset correction unit by way of the switches.

Alternatively, the noise suppression apparatus of the present invention suppresses the amplitude of noise generated in a transmission apparatus and includes:

at least one local leak correction unit that corrects change of local leaks generated by hopping of radio frequencies; and at least one noise elimination unit that suppresses the amplitude of the noise generated in the local leak correction unit and that is provided with a switch that turns ON and OFF in synchronization with the hopping of radio frequencies and that is connected between two differential output lines of the local leak correction unit.

EXEMPLARY EMBODIMENT

The present invention is next described with reference to the accompanying figures.

(First Exemplary Embodiment)

Figure 9:
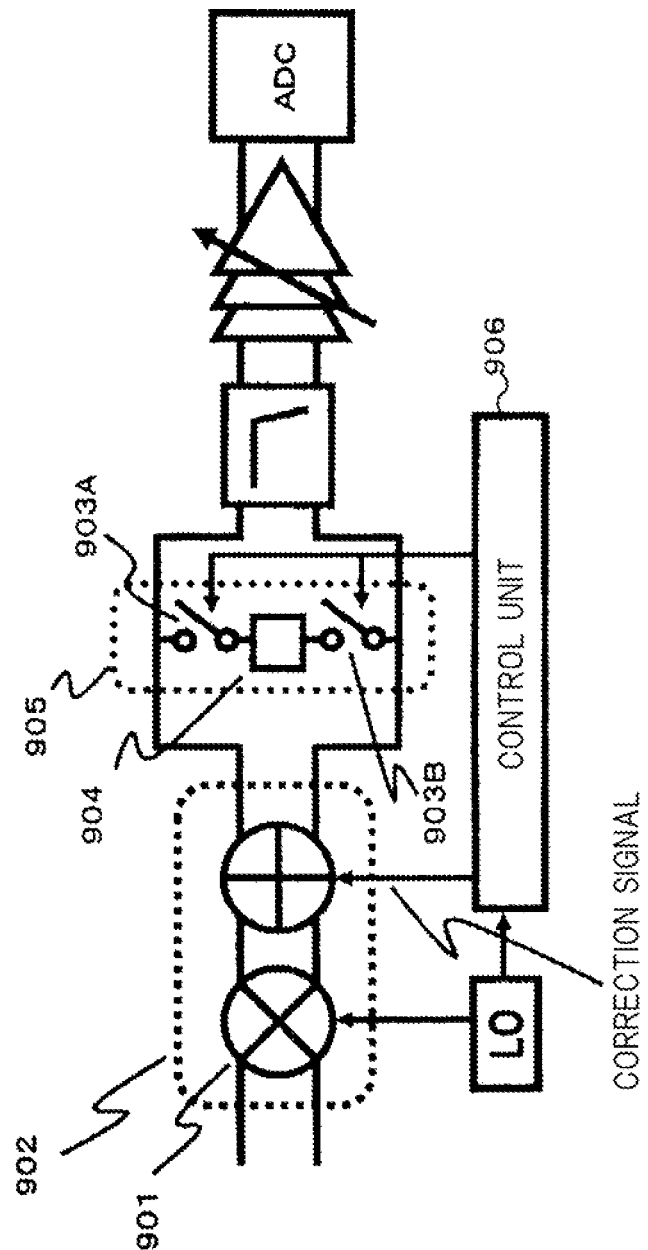
FIG. 9 is a block diagram showing the configuration of the noise suppression apparatus of the first exemplary embodiment.
Figure 10:
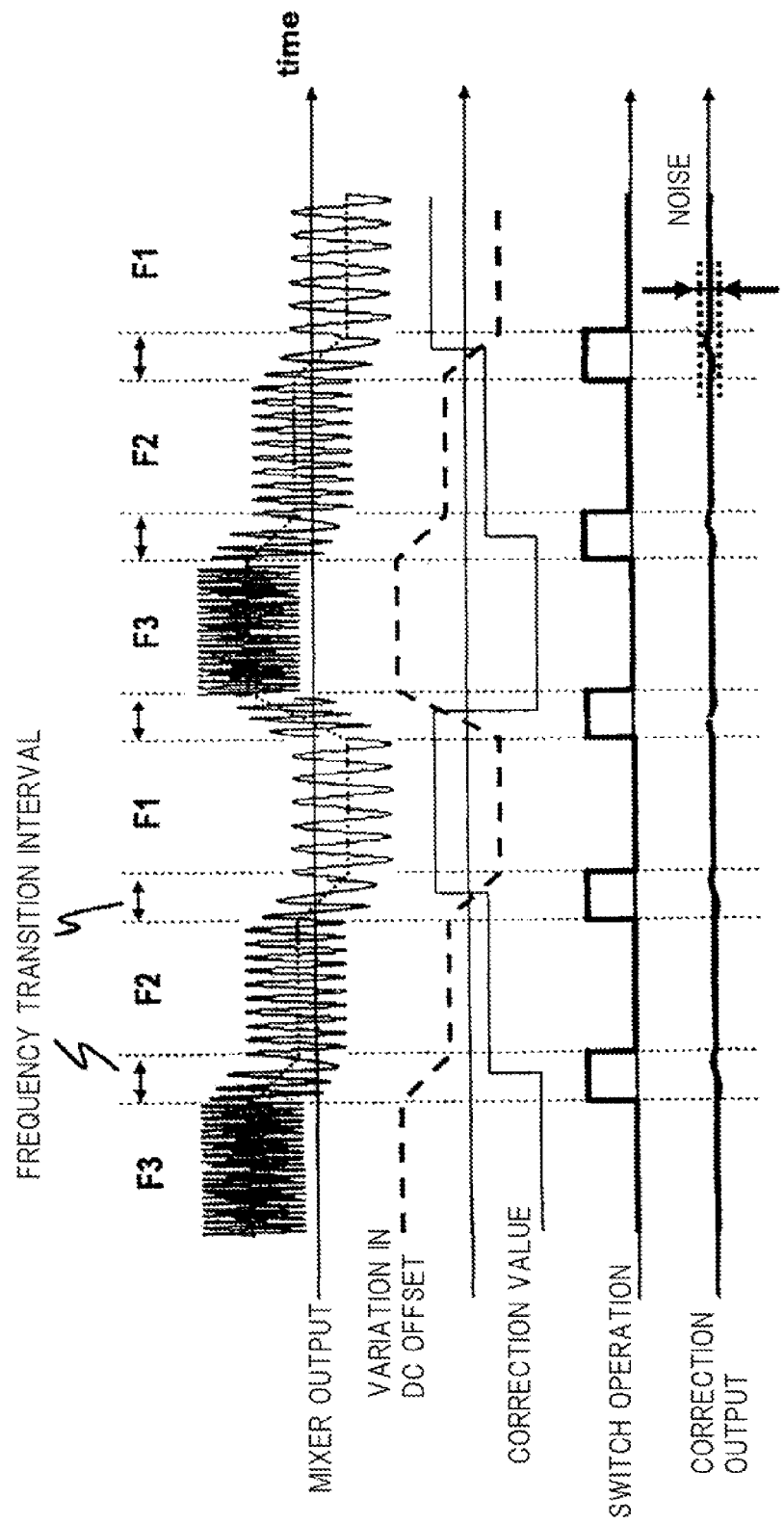
FIG. 10 is a timing chart showing the operation of the noise suppression apparatus shown in FIG. 9.

FIG. 9 is a block diagram showing the configuration of the noise suppression apparatus of the first exemplary embodiment, and FIG. 10 is a timing chart showing the operation of the noise suppression apparatus shown in FIG. 9. FIG. 9 shows an example of the configuration from the mixer to the ADC that are provided in the reception apparatus that includes the noise suppression apparatus of the first exemplary embodiment.

As shown in FIG. 9, the noise suppression apparatus of the first exemplary embodiment is of a configuration that includes: offset correction unit 902 that includes mixer 901; noise elimination unit 905 that is connected between the two differential output lines of offset correction unit 902; and control unit 906 that both supplies a correction signal for correcting DC offset to offset correction unit 902 and controls the operation of noise elimination unit 905.

Noise elimination unit 905 is provided with switch 903A, amplitude suppression unit 904, and switch 903B that are connected in series.

Figure 1:
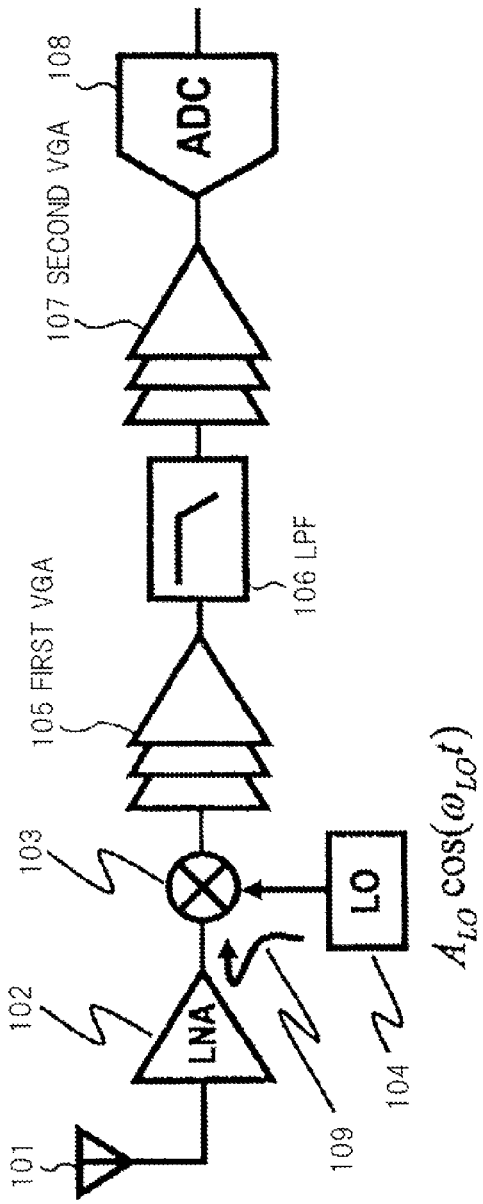
FIG. 1 is a block diagram showing the configuration of the background art of a reception apparatus that employs a direct conversion method.
Figure 2:
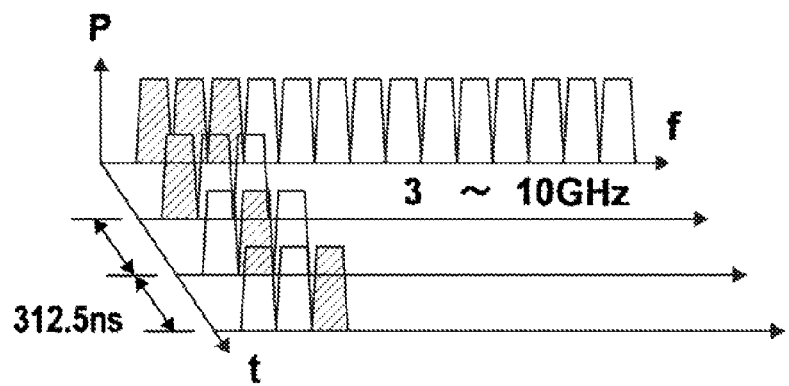
FIG. 2 is a schematic view showing the state of frequency hopping in a UWB communication apparatus.
Figure 3:
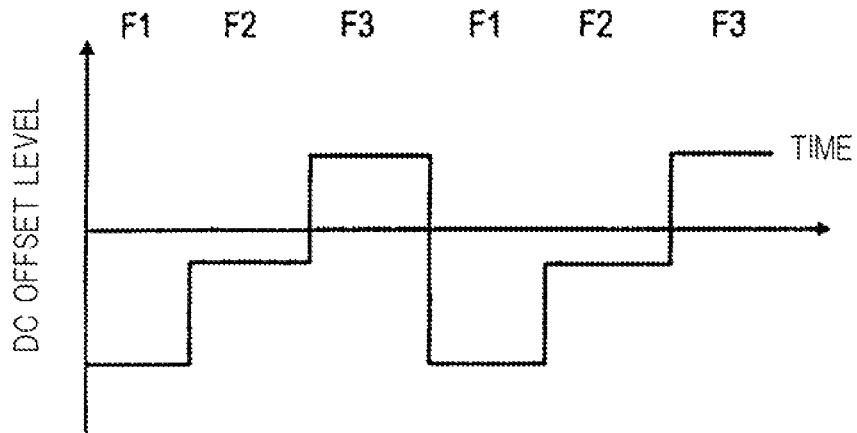
FIG. 3 is a schematic view showing the state of changes caused by frequency hopping in the DC offset that appears in the output of the mixer shown in FIG. 1.
Figure 4A:
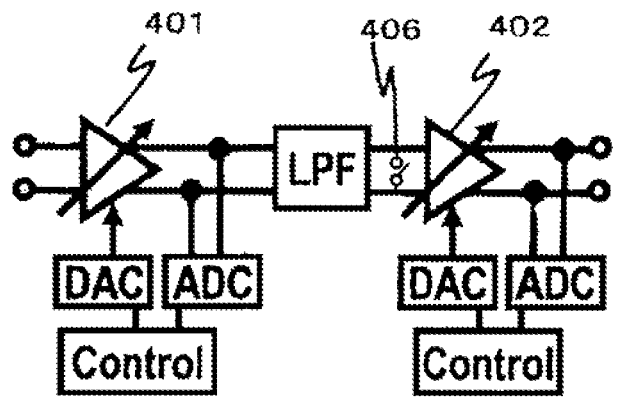
FIG. 4A is a block diagram showing the configuration of the first example of the background art for correcting a DC offset.
Figure 4B:
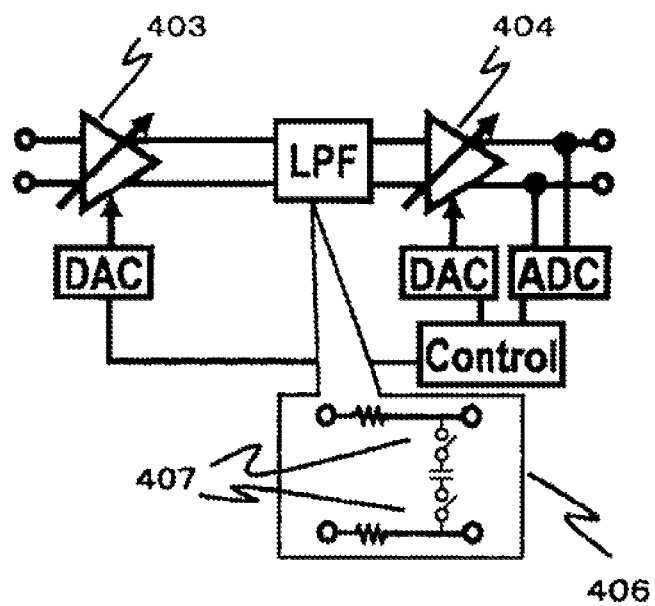
FIG. 4B is a block diagram showing the configuration of the first example of the background art for correcting a DC offset.
Figure 5:
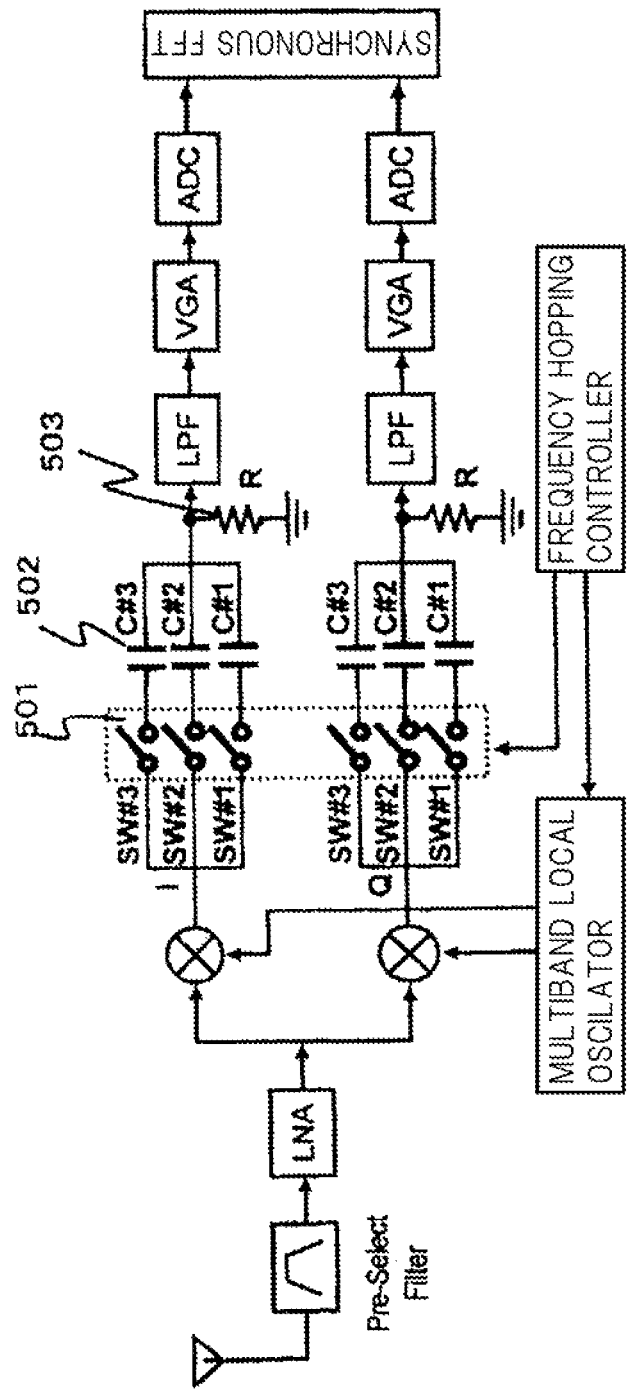
FIG. 5 is a block diagram showing the configuration of the second example of the background art for correcting a DC offset.
Figure 6:
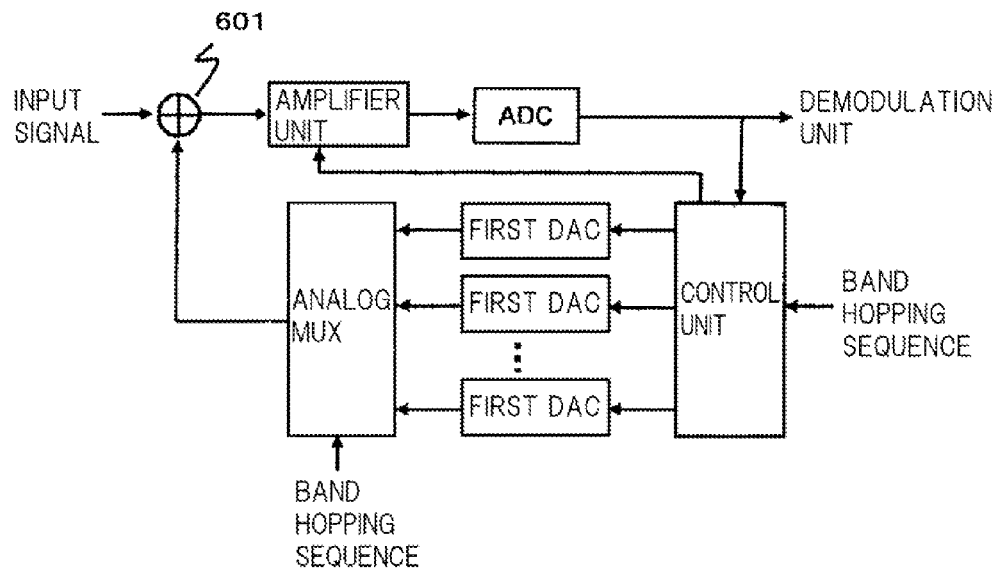
FIG. 6 is a block diagram showing the configuration of the third example of the background art for correcting a DC offset.
Figure 7:
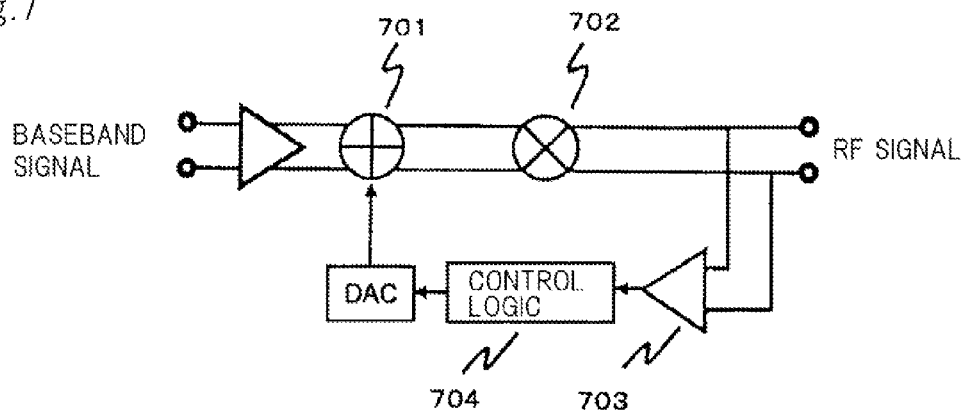
FIG. 7 is a block diagram showing the configuration of the fourth example of the background art for correcting local leaks.
Figure 8:
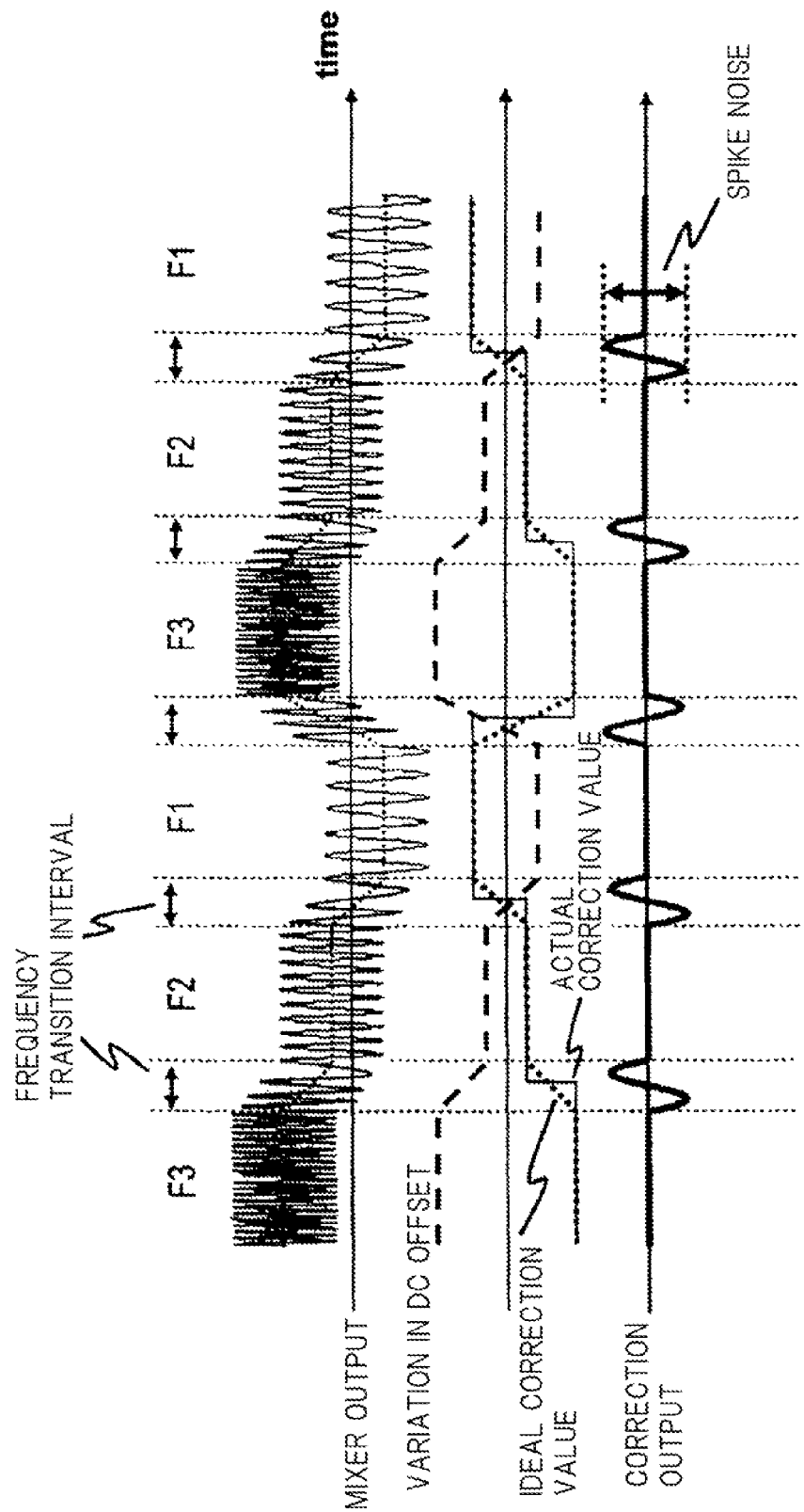
FIG. 8 is a timing chart showing the state of the generation of spike noise at the time of correcting a DC offset by means of the background art.

Offset correction unit 902 is provided with a circuit of the background art shown in FIGS. 4-6 and has the capability of correcting a DC offset that is supplied from mixer 901 and that fluctuates in synchronization with frequency hopping.

Switches 903A and 903B are connected between the two differential output lines of offset correction unit 902 and amplitude suppression unit 904, and in accordance with a control signal supplied from control unit 906, turn ON in frequency transition intervals that accompany hopping of radio frequencies used as carriers, and turn OFF in signal reception intervals in which the radio frequency used as a carrier is fixed.

When switch 903A and 903B are ON, amplitude suppression unit 904 clips the difference in potential of the two output signals (differential signals) of offset correction unit 902 to no more than a threshold value that is set in advance or uses a circuit in which impedance is sufficiently small with respect to the high-frequency component to suppress the amplitude of the high-frequency component contained in the two output signals of offset correction unit 902.

Control unit 906 can be realized by a CPU or DSP that operates in accordance with a program or by the combination of various types of logic circuits.

The operation of the noise suppression apparatus provided in the reception apparatus shown in FIG. 9 is next described using FIG. 10.

FIG. 10 shows an example of the signal waveform of the reception apparatus that performs frequency hopping at the three frequencies F1, F2, and F3.

As shown in FIG. 10, a waveform appears in the output of mixer 901 that contains: LO signals corresponding to F1, F2, and F3; a DC offset indicated by a broken line; and a received signal (not shown). In FIG. 10, only the changes in the DC offset are extracted and shown.

As described hereinabove, the DC offset can be corrected by generating an ideal correction value having polarity that differs from the DC offset and by adding this correction value to the output signal of the mixer. Generation of the ideal correction value necessitates both high-speed detection of changes in the DC offset and the use of a DAC that features both high speed and high resolution. In the present exemplary embodiment, a DAC having a simple construction is used in offset correction unit 902 to limit cost increases in the radio apparatus. As a result, a correction value that follows the change in the DC offset cannot be generated (see "correction value" in FIG. 10).

In the present exemplary embodiment, however, switches 903A and 903B are turned ON in frequency transition intervals that accompany frequency hopping and the output signal of offset correction unit 902 is passed to amplitude suppression unit 904. At this time, the spike noise generated in the frequency transition interval is a comparatively high frequency component, and its amplitude is suppressed by amplitude suppression unit 904 as shown by "correction output" of FIG. 10.

Accordingly, even when spike noise is supplied as output from offset correction unit 902 in frequency transition intervals, the amplitude of the spike noise is suppressed by amplitude suppression unit 904, whereby the amplitude of the spike noise contained in the signal following amplification by a VGA (baseband output) is also reduced.

The switching noise generated by the ON/OFF of switches 903A and 903B appears in the in-phase component of the differential output of offset correction unit 902 and can therefore be ignored. Even though switching noise of the differential component appears in the differential output of offset correction unit 902 due to variations in the characteristics of parts that make up offset correction unit 902, this switching noise can be reduced to a negligible degree by reducing the size of switches 903A and 9038.

As a result, according to the noise suppression apparatus of the present exemplary embodiment, despite the occurrence of spike noise in offset correction unit 902 due to such causes as correction error or divergence in correction timing, the amplitude of this spike noise can be suppressed by noise elimination unit 905, and as a result, skew of the frequency-switching timing and the output timing of correction values of the DC offset need not be considered at the time of design. Design costs can therefore be reduced.

In addition, even when a DAC that generates glitch noise is used in offset correction unit 902, the ability of noise elimination unit 905 to suppress the spike noise eliminates the need for using a high-performance DAC. As a result, the circuit area and power consumption of the radio apparatus can be decreased.

Although an example of a configuration is shown in the present exemplary embodiment in which noise elimination unit 905 is connected in a stage following offset correction unit 902, noise elimination unit 905 may also be connected in a stage following a filter or VGA if the circuit is not operated at saturation. In addition, two or more noise elimination units 905 may be provided between offset correction unit 902 and an ADC.

(Second Exemplary Embodiment)

An example of a configuration was shown in the first exemplary embodiment in which amplitude suppression unit 904 was arranged between two differential output lines of offset correction unit 902. The noise suppression apparatus of the second exemplary embodiment has a configuration in which noise elimination units are arranged between each of the two differential output lines of the offset correction unit and a low-impedance nodes (for example, the ground potential or power supply).

Figure 11:
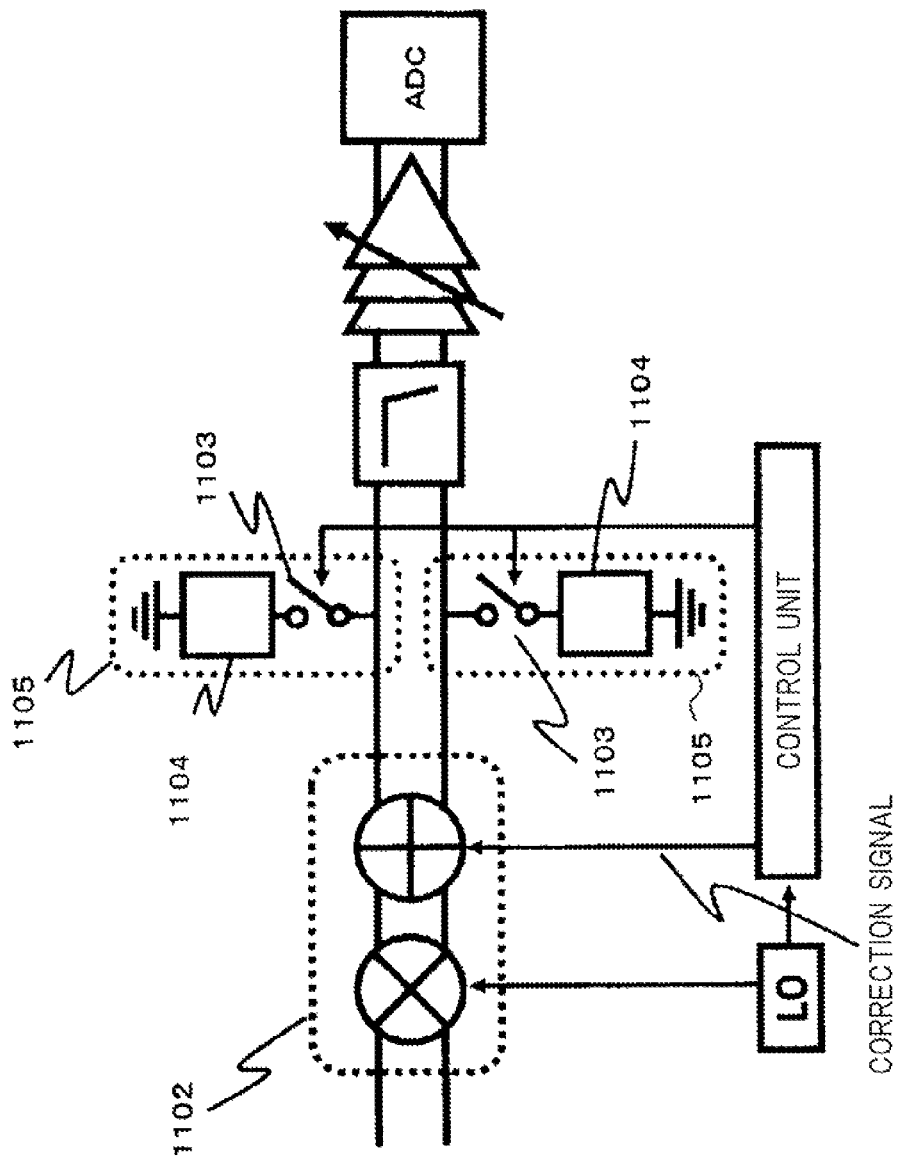
FIG. 11 is a block diagram showing the configuration of the noise suppression apparatus of the second exemplary embodiment.

FIG. 11 is a block diagram showing the configuration of the noise suppression apparatus of the second exemplary embodiment.

As shown in FIG. 11, the noise suppression apparatus of the second exemplary embodiment has a configuration in which noise elimination units 1105 are connected between each of two differential output lines of offset correction unit 1102 and ground potential.

Each of noise elimination units 1105 is provided with switch 1103 and amplitude suppression unit 1104 connected in series. Although an example of a configuration is shown in FIG. 11 in which each noise elimination unit 1105 is connected between a respective one of two differential output lines of offset correction unit 1102 and the ground potential, as described hereinabove, each noise elimination unit 1105 may also be connected between a respective one of two differential output lines of offset correction unit 1102 and another impedance node (for example, a power supply). The configuration and operation are otherwise the same as the first exemplary embodiment and redundant explanation is therefore here omitted.

According to the noise suppression apparatus of the second exemplary embodiment, noise elimination units 1105 are connected between two differential output lines of offset correction unit 1102 and the ground potential or low-impedance nodes, whereby, in addition to the same effects as the first exemplary embodiment, spike noise that appears in the in-phase component of the output signal of offset correction unit 1102 can be eliminated.

(Third Exemplary Embodiment)

The third exemplary embodiment is an example in which the noise suppression apparatus shown in the first exemplary embodiment is applied to a transmission apparatus.

Figure 12:
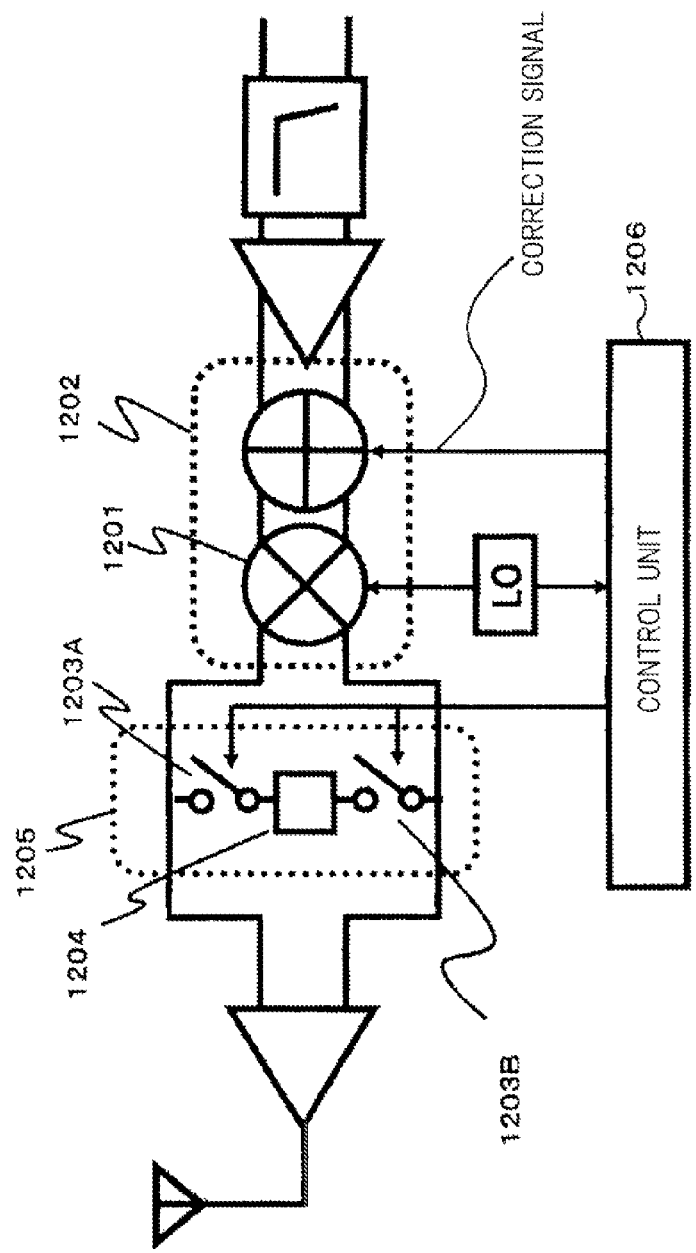
FIG. 12 is a block diagram showing the configuration of the noise suppression apparatus of the third exemplary embodiment.

FIG. 12 is a block diagram showing the configuration of the noise suppression apparatus of the third exemplary embodiment. FIG. 12 shows an example of a configuration regarding the radio signal processing from a mixer to an antenna apparatus provided in a transmission apparatus that includes the noise suppression apparatus of the third exemplary embodiment.

As shown in FIG. 12, the noise suppression apparatus of the third exemplary embodiment has a configuration that includes: local leak correction unit 1202 that includes mixer 1201; noise elimination unit 1205 that is connected between the two differential output lines of local leak correction unit 1202; and control unit 1206 that both supplies a correction signal for correcting a DC offset to local leak correction unit 1202 and that controls the operation of noise elimination unit 1205.

Noise elimination unit 1205 is provided with switch 1203A, amplitude suppression unit 1204, and switch 1203B connected in series.

Local leak correction unit 1202 is provided with, for example, a circuit of the background art shown in FIGS. 4-6 and has the capability of correcting local leaks supplied as output from mixer 1201 that change in synchronization with the hopping of frequencies.

Control unit 1206 can be realized by a CPU or DSP that operates in accordance with a program or by the combination of various types of logic circuits.

In the present exemplary embodiment, under the control of control unit 1206, switches 1203A and 1203B are turned ON in the frequency transition intervals that accompany frequency hopping and the output signal of offset correction unit 1202 is passed to amplitude suppression unit 1204, similar to the noise suppression apparatus of the first exemplary embodiment. At this time, the spike noise that is generated in the frequency transition intervals is a comparatively high frequency component and its amplitude is therefore suppressed by amplitude suppression unit 1204.

Thus, according to the noise suppression apparatus of the present exemplary embodiment, a desired RF signal can be obtained without saturation in an amplification circuit that transmits the RF signal at a later stage, and further, without generation of unwanted radiation.

In addition, despite the occurrence of spike noise due to the correction error or divergence of correction timing of local leak correction unit 1202, the amplitude of the spike noise can be suppressed by noise elimination unit 1205, whereby the skew of the output timing of DC offset correction values and the switching timing of frequencies need not be considered at the time of design. Design costs can therefore be reduced.

Still further, spike noise can be suppressed by noise elimination unit 1205 even when a DAC that generates glitch noise is used in local leak correction unit 1202, whereby the need to use a high-performance DAC is eliminated. As a result, power consumption and circuit area of the radio apparatus can be decreased.

Although an example of a configuration is shown in the present exemplary embodiment in which noise elimination unit 1205 is connected in a stage following local leak correction unit 1202, noise elimination unit 1205 may also be arranged in a stage following an amplifier such as an LNA. Alternatively, two or more noise elimination units 1205 may be provided in a stage following local leak correction unit 1202.

(Fourth Exemplary Embodiment)

The fourth exemplary embodiment is a case in which the noise suppression apparatus shown in the second exemplary embodiment is applied to a transmission apparatus.

Figure 13:
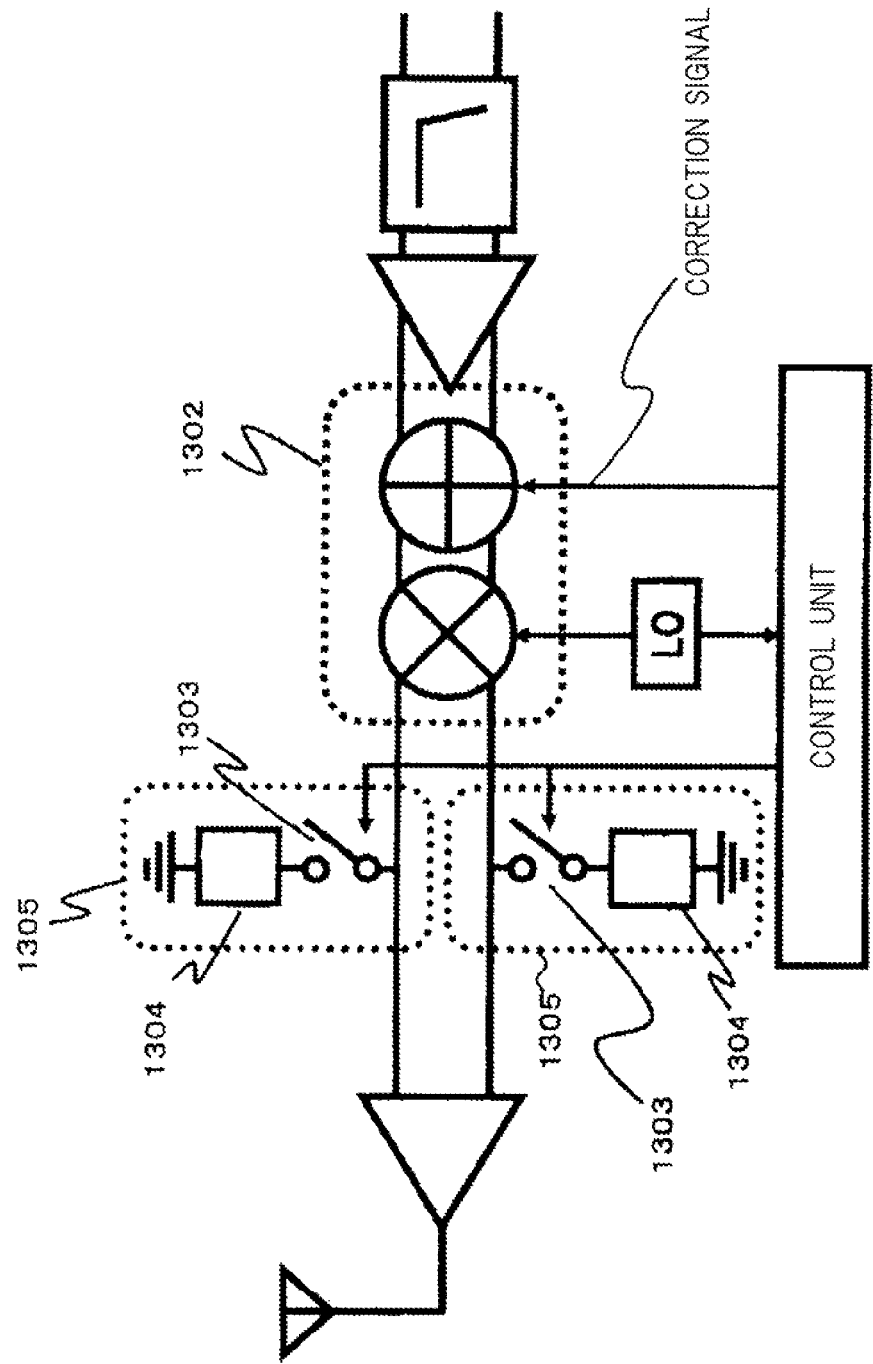
FIG. 13 is a block diagram showing the configuration of the noise suppression apparatus of the fourth exemplary embodiment.

FIG. 13 is a block diagram showing the configuration of the noise suppression apparatus of the fourth exemplary embodiment.

As shown in FIG. 13, the fourth exemplary embodiment has a configuration in which noise elimination units 1305 are connected between each of two differential output lines of local leak correction unit 1302 and the ground potential.

Each noise elimination unit 1305 is provided with switch 1303 and amplitude suppression unit 1304 connected in series. Although an example of the configuration is shown in FIG. 13 in which each of noise elimination units 1305 is connected between a respective one of two differential output lines of local leak correction unit 1302 and the ground potential, each of noise elimination units 1305 may also be connected between a respective one of two differential output lines of local leak correction unit 1302 and another low-impedance node (for example, the power supply). The configuration and operation are otherwise the same as the third exemplary embodiment and redundant explanation is therefore here omitted.

According to the noise suppression apparatus of the fourth exemplary embodiment, noise elimination units 1305 are each connected between a respective one of two differential output lines of local leak correction unit 1302 and the ground potential or a low-impedance node, whereby, in addition to the same effects as in the third exemplary embodiment, spike noise that appears in the differential component in the output signal of local leak correction unit 1302 can be eliminated.

(Fifth Exemplary Embodiment)

In the first to fourth exemplary embodiments, configurations were shown in which an amplitude suppression unit was provided in the noise elimination unit. The noise suppression apparatus of the fifth exemplary embodiment has a configuration in which the noise elimination unit is provided with only a switch and in which the switch is turned ON and the two differential output lines of the offset correction unit are thus short-circuited in the frequency transition intervals that occur at the time of frequency hopping.

Figure 14:
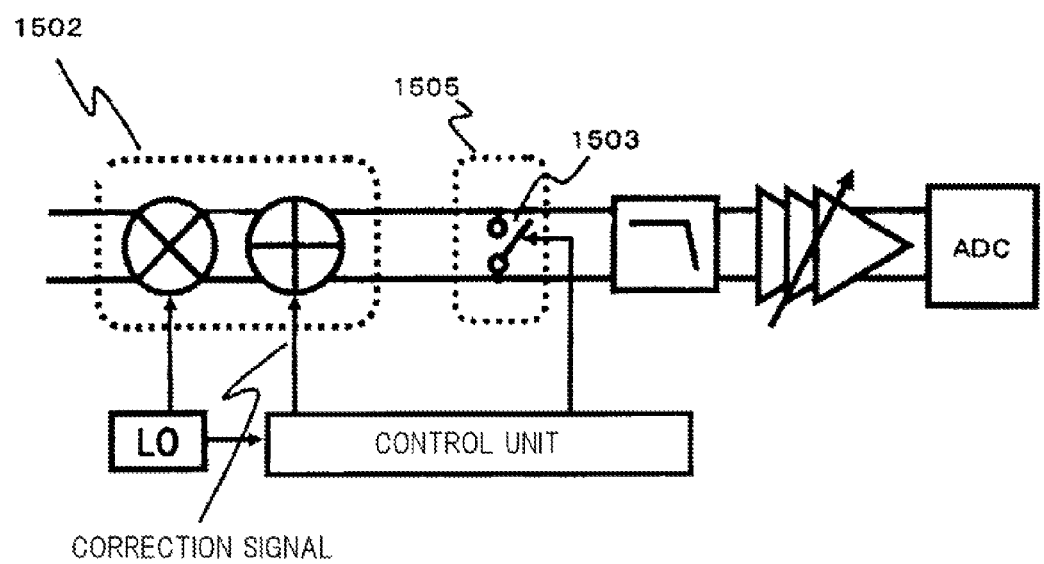
FIG. 14 is a block diagram showing the configuration of the noise suppression apparatus of the fifth exemplary embodiment.

FIG. 14 is a block diagram showing the configuration of the noise suppression apparatus of the fifth exemplary embodiment.

As shown in FIG. 14, in the fifth exemplary embodiment, noise elimination unit 1505 is connected between the two differential output lines of offset correction unit 1502. Noise elimination unit 1505 is provided with switch 1503. Switch 1503 turns ON in frequency transition intervals that accompany hopping of the radio frequencies used as the carrier and turns OFF in signal reception intervals in which the radio frequency used as carrier is fixed.

In this type of configuration, as in the first exemplary embodiment, even when spike noise is supplied as output from offset correction unit 1502 in frequency transition intervals, this spike noise is eliminated by noise elimination unit 1505, and the amplitude of spike noise that is included in the signal (baseband output) following amplification by a VGA is therefore reduced.

The noise suppression apparatus of the present exemplary embodiment has no need for the amplitude suppression unit shown in the first to fourth exemplary embodiments and therefore enables a cutback in the number of parts.

Although an example of a configuration was shown in the present exemplary embodiment in which the amplitude suppression unit was eliminated from the noise elimination unit shown in the first exemplary embodiment, the configuration of noise elimination unit 1505 of the present exemplary embodiment can also be applied to each of the noise suppression apparatuses shown in the second to fourth exemplary embodiments.

EXAMPLES

Examples of the present invention are next described using the accompanying drawings.

In the present examples, actual configurations of the amplitude suppression unit shown in the first to fourth exemplary embodiments are described.

Figure 15A:
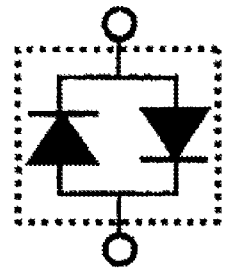
FIG. 15A is a circuit diagram showing an example of the amplitude suppression unit shown in the first to fourth exemplary embodiments.
Figure 15B:
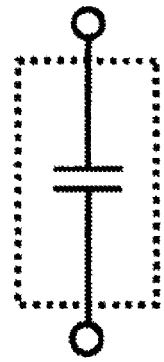
FIG. 15B is a circuit diagram showing an example of the amplitude suppression unit shown in the first to fourth exemplary embodiments.
Figure 15C:
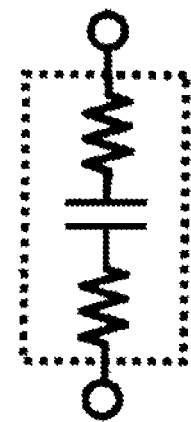
FIG. 15C is a circuit diagram showing an example of the amplitude suppression unit shown in the first to fourth exemplary embodiments.

FIGS. 15A-C show examples of the amplitude suppression unit shown in the first to fourth exemplary embodiments.

FIG. 15A is a configuration provided with two diodes having mutually connected cathodes and anodes. In this type of configuration, the difference in potential between the two terminals can be suppressed to no greater than the threshold voltage of the diodes. In other words, the amplitude suppression unit shown in FIG. 15A operates as a limiter circuit that clips the signal component that exceeds a predetermined amplitude. Although FIG. 15A shows a configuration that is provided with only two diodes, a known limiter circuit can be made up by combining the diodes shown in FIG. 15A with active elements such as operational amplifiers.

FIG. 15B is a configuration provided with a capacitor that lowers the impedance of the high-frequency component that is applied between two terminals in an amplitude suppression unit. Because the capacitor lowers impedance to the degree that the signal frequency is high, the capacitor functions as a low-pass filter (HPF). As a result, the amplitude of the high-frequency component can be suppressed.

FIG. 15C is a configuration provided with resistors and a capacitor connected in series in an amplitude suppression unit. By connecting resistors in series with a capacitor as shown in FIG. 15C, the time constant between the two terminals can be set to an intended value. Although a configuration is show in FIG. 15C in which a capacitor and resistors are connected in series, the capacitor and resistors may also be connected in parallel.

Although the invention of the present application has been described hereinabove with reference to exemplary embodiments, the invention of the present application is not limited to the above-described exemplary embodiments. The configuration and details of the invention of the present application are open to various modifications within the scope of the invention of the present application that will be understood by one of ordinary skill in the art.

The present application is the National Phase of PCT/JP2009/050082, filed Jan. 7, 2009, which claims priority based on Japanese Patent Application No.2008-014765, filed on Jan. 25, 2008, the disclosure of which is incorporated herein by reference in its entirety.

The invention claimed is:

1. A noise suppression apparatus for suppressing an amplitude of noise generated in a reception apparatus, comprising:
at least one offset correction unit that corrects changes in a DC offset generated by hopping of radio frequencies;
at least one noise elimination unit that suppresses the amplitude of said noise generated in said at least one offset correction unit and that is provided with switches that turn ON and OFF in synchronization with said hopping of radio frequencies, and an amplitude suppression unit that is connected between two differential output lines of said at least one offset correction unit by way of said switches; and
a control unit that turns ON said switches during an interval when said radio frequency is changing, but turns OFF said switches during an interval when said radio frequency is fixed,
wherein said at least one noise elimination unit includes said amplitude suppression unit and said switches,
wherein said noise is generated in said at least one offset correction unit during the interval when said radio frequency is changing in said hopping of radio frequencies.

2. The noise suppression apparatus according to claim 1, wherein said amplitude suppression unit is provided with a limiter circuit that clips a signal component that exceeds a predetermined amplitude.

3. The noise suppression apparatus according to claim 1, wherein said amplitude suppression unit is provided with a capacitor.

4. The noise suppression apparatus according to claim 1, wherein said amplitude suppression unit is provided with resistors and a capacitor connected in a series or in parallel.

5. A noise suppression apparatus for suppressing an amplitude of noise generated in a reception apparatus, comprising:
at least one offset correction unit that corrects changes in a DC offset generated by hopping of radio frequencies; and
at least one noise elimination unit that suppresses the amplitude of said noise generated in said at least one offset correction unit and that is provided with switches that turn ON and OFF in synchronization with said hopping of radio frequencies, and two amplitude suppression units respectively connected between low-impedance nodes and two differential output lines of said at least one offset correction unit by way of said switches; and
a control unit that turns ON said switches during an interval when said radio frequency is changing, but turns OFF said switches during an interval when said radio frequency is fixed,
wherein said at least one noise elimination unit includes said amplitude suppression units and said switches,
wherein said noise is generated in said at least one offset correction unit during the interval when said radio frequency is changing in said hopping of radio frequencies.

6. The noise suppression apparatus according to claim 5, wherein said amplitude suppression unit is provided with a limiter circuit that clips a signal component that exceeds a predetermined amplitude.

7. The noise suppression apparatus according to claim 5, wherein said amplitude suppression unit is provided with a capacitor.

8. The noise suppression apparatus according to claim 5, wherein said amplitude suppression unit is provided with resistors and a capacitor connected in a series or in parallel.

9. A noise suppression apparatus for suppressing an amplitude of noise generated in a reception apparatus, comprising:
at least one offset correction unit that corrects changes in a DC offset generated by hopping of radio frequencies; and
at least one noise elimination unit that suppresses the amplitude of the noise generated in the said at least one offset correction unit and that is provided with a switch that turns ON and OFF in synchronization with said hopping of radio frequencies and that is connected between two differential output lines of said at least one offset correction unit; and a control unit that turns ON said switches during an interval when said radio frequency is changing, but turns OFF said switches during an interval when said radio frequency is fixed, wherein said noise is generated in said at least one offset correction unit during the interval when said radio frequency is changing in said hopping of radio frequencies.

10. A noise suppression apparatus for suppressing an amplitude of noise generated in a transmission apparatus, comprising:

at least one local leak correction unit that corrects changes of local leaks generated by hopping of radio frequencies; and at least one noise elimination unit that suppresses the amplitude of said noise generated in said at least one local leak correction unit and that is provided with switches that turn ON and OFF in synchronization with hopping of said radio frequencies, and an amplitude suppression unit connected between two differential output lines of said at least one local leak correction unit by way of said switches; and a control unit that turns ON said switches during an interval when said radio frequency is changing, but turns OFF said switches during an interval when said radio frequency is fixed, wherein said at least one noise elimination unit includes said amplitude suppression unit and said switches, wherein said noise is generated in said at least one local leak correction unit during the interval when said radio frequency is changing in said hopping of radio frequencies.

11. The noise suppression apparatus according to claim 10, wherein said amplitude suppression unit is provided with a limiter circuit that clips a signal component that exceeds a predetermined amplitude.

12. The noise suppression apparatus according to claim 10, wherein said amplitude suppression unit is provided with a capacitor.

13. The noise suppression apparatus according to claim 10, wherein said amplitude suppression unit is provided with resistors and a capacitor connected in a series or in parallel.

14. A noise suppression apparatus for suppressing an amplitude of noise generated in a transmission apparatus, comprising:

at least one local leak correction unit that corrects changes of local leaks generated by hopping of radio frequencies; and at least one noise elimination unit that suppresses the amplitude of said noise generated in said at least one local leak correction unit and that is provided with switches that turn ON and OFF in synchronization with said hopping of radio frequencies, and two amplitude suppression units respectively connected between low-impedance nodes and two differential output lines of said at least one local leak correction unit by way of said switches; and a control unit that turns ON said switches during an interval when said radio frequency is changing, but turns OFF said switches during an interval when said radio frequency is fixed wherein said at least one noise elimination unit includes said amplitude suppression units and said switches, wherein said noise is generated in said at least one local leak correction unit during the interval when said radio frequency is changing in said hopping of radio frequencies.

15. The noise suppression apparatus according to claim 14, wherein said amplitude suppression unit is provided with a limiter circuit that clips a signal component that exceeds a predetermined amplitude.

16. The noise suppression apparatus according to claim 14, wherein said amplitude suppression unit is provided with a capacitor.

17. The noise suppression apparatus according to claim 14, wherein said amplitude suppression unit is provided with resistors and a capacitor connected in a series or in parallel.

18. A noise suppression apparatus for suppressing an amplitude of noise generated in a transmission apparatus, comprising:

at least one local leak correction unit that corrects changes of local leaks generated by hopping of radio frequencies; and at least one noise elimination unit that suppresses the amplitude of said noise generated in said at least one local leak correction unit and that is provided with a switch that turns ON and OFF in synchronization with said hopping of radio frequencies and that is connected between two differential output lines of said at least one local leak correction unit; and a control unit that turns ON said switches during an interval when said radio frequency is changing, but turns OFF said switches during an interval when said radio frequency is fixed, wherein said noise is generated in said at least one local leak correction unit during the interval when said radio frequency is changing in said hopping of radio frequencies.

* * * * *